United States Patent [19]
Kato et al.

[11] Patent Number: 6,061,906
[45] Date of Patent: *May 16, 2000

[54] PROCESS FOR MANUFACTURING A SPOOL VALVE

[75] Inventors: Keigo Kato; Masataka Mizuno, both of Aichi-ken, Japan

[73] Assignee: Aoyama Seisakusho Co., Ltd., Nagoya, Japan

[ * ] Notice: This patent is subject to a terminal disclaimer.

[21] Appl. No.: 09/069,059

[22] Filed: Apr. 28, 1998

Related U.S. Application Data

[62] Division of application No. 08/782,593, Jan. 13, 1997, Pat. No. 5,782,268.

[30] Foreign Application Priority Data

Jan. 24, 1996 [JP] Japan ................................. 8-010020
Jun. 26, 1996 [JP] Japan ................................. 8-166140

[51] Int. Cl.⁷ ..................................................... B21H 1/00
[52] U.S. Cl. .................................. 29/890.13; 29/890.126; 29/517
[58] Field of Search ................... 29/890.126, 890.127, 29/890.129, 890.13, 460, 517, 520; 137/625.69; 251/324

[56] References Cited

U.S. PATENT DOCUMENTS

| | | |
|---|---|---|
| 139,463 | 6/1873 | Gibbs . |
| 240,286 | 4/1881 | Trethewey . |
| 430,484 | 6/1890 | Richards . |
| 435,322 | 8/1890 | Richards . |
| 2,985,566 | 5/1961 | Tsien et al. .................. 29/890.129 |
| 3,095,011 | 6/1963 | Banker . |
| 3,103,739 | 9/1963 | Moog ......................... 29/890.129 |
| 3,163,175 | 12/1964 | Pearson . |
| 3,307,586 | 3/1967 | Meyer . |
| 3,608,171 | 9/1971 | Stradtmann ................. 29/890.129 |
| 3,635,249 | 1/1972 | Kirkman . |
| 3,756,280 | 9/1973 | Parquet . |
| 3,792,603 | 2/1974 | Orian ............................. 29/517 |
| 4,190,073 | 2/1980 | Claycomb . |
| 4,575,913 | 3/1986 | Sugiuchi . |

(List continued on next page.)

FOREIGN PATENT DOCUMENTS

| | | |
|---|---|---|
| 0 340 128 A1 | 11/1989 | European Pat. Off. . |
| 89 11 766 | 3/1991 | Germany . |
| 1-316573 | 12/1989 | Japan . |
| 1450 380 | 9/1976 | United Kingdom . |

OTHER PUBLICATIONS

Patent Abstracts of Japan, vol. 95, No. 8, Sep. 29, 1995 & JP 07 119845 A (Rhythm Corp.), May 12, 1995.

Patent Abstracts of Japan, vol. 14, No. 364, (M–1007), Aug. 7, 1990 and JP 02 129477 A (Aisin AW Co., Ltd.), May, 1990.

*Primary Examiner*—Irene Cuda
*Assistant Examiner*—Trinh T. Nguyen
*Attorney, Agent, or Firm*—Frishauf, Holtz, Goodman, Langer & Chick, P.C.

[57] ABSTRACT

A process for manufacturing a spool valve whereby a plurality of quenching processed collars are fitted to a shaft material so that the collars are arranged at predetermined positions on the shaft material. The collars have respective substantially central holes through which the shaft material extends. The diameter of portions of the shaft material is contracted in a vicinity of both opposite ends of each of the collars by rolling dies so as to cause plastic flow of a metal constituting the shaft material. Pairs of circular convex portions are then formed on outer circumferential faces of the diameter contracted portions of the shaft material. The circular convex portions each have an outer diameter larger than an inner diameter of the substantially central holes of the collars, and the circular convex portions are formed such that side faces thereof are in close contact with respective associated circular concave portions formed at both ends of the collars in a vicinity of the substantially central holes of the collars, whereby the collars are fixed to the shaft material.

8 Claims, 7 Drawing Sheets

U.S. PATENT DOCUMENTS

| | | | |
|---|---|---|---|
| 4,880,260 | 11/1989 | Gotoh et al. | 29/517 |
| 4,922,785 | 5/1990 | Arnold et al. | 29/421.1 |
| 5,041,253 | 8/1991 | Husted | 29/460 |
| 5,072,885 | 12/1991 | Hans . | |
| 5,080,406 | 1/1992 | Hyatt et al. | 29/520 |
| 5,201,171 | 4/1993 | Anderton et al. | 29/517 |
| 5,314,204 | 5/1994 | Durocher et al. | 29/517 |
| 5,405,176 | 4/1995 | Babel et al. | 29/520 |
| 5,421,367 | 6/1995 | Murata . | |

PROCESS FOR MANUFACTURING A SPOOL VALVE

This is a division of application Ser. No. 08/782,593 filed Jan. 13, 1997, now is U.S. Pat. No. 5,782,268.

BACKGROUND OF THE INVENTION

This invention relates to a spool valve such as an oil valve for an automatic transmission, which is integrated into a hydraulic control circuit of an automatic transmission or the like of an automobile and conducts switching of oil passage, and a process for manufacturing the same.

In a conventional spool valve to be used as an oil valve for an automatic transmission or the like, it is common that a rod-shaped material 20 made of a metal as shown in FIG. 10 is cut by a lathe or the like, and a shaft 21 on which a valve body is carved out is prepared as shown in FIG. 11. Therefore, there are problems that a large amount of a material is cut and wasted as chips, and time is required for machining of material thus lowering productivity. Moreover, in order to give abrasion resistance to such a shaft, after machining of material, it is necessary to subject the whole surface of the shaft to a carburization quenching processing as shown in FIG. 12. However, due to the carburization quenching processing, thermal strain of the shaft is necessarily induced, so that after carburization quenching processing, it is necessary to subject it to straightening as shown in FIG. 13. Thus, there are problems that productivity is low, and cost is high.

SUMMARY OF THE INVENTION

An object of the present invention is to provide a process for manufacturing a spool valve in which productivity is high and wasting of a material can be reduced.

The spool valve of the present invention comprises a shaft having plural small diameter portions formed at required intervals on the circumferential surface of the shaft; a pair of circular convex portions having a diameter larger than the inner diameter of a collar, provided on the outer circumferential faces of each small diameter portion; and said collar subjected to quenching processing, arranged between said circular convex portions so that the side faces of said circular convex portions are in close contact with circular concave portions formed at both ends of a center hole of said collar or both side faces themselves of said collar. The manufacturing process of the present invention comprises fitting plural collars subjected to quenching processing, to a shaft material so that the collars are arranged at required positions; contracting the diameters of the portions of said shaft material in the vicinity of both ends of the collars by rolling dies to cause plastic flow of a metal constituting said shaft material; and forming circular convex portions having a diameter larger than the inner diameters of said collars on the portions of said shaft material so that the side faces of the circular convex portions are in close contact with circular concave portions formed at both ends of center holes of said collars or both side faces themselves of said collars, whereby said collars are fixed to said shaft material. In the manufacturing process of the present invention, it is one of embodiments that the length of the above shaft material has a length corresponding to plural spool valves; the number of the collars to be fitted to the above shaft material is a number of collars required for the respective spool valves; and at the time of completion of the above step of forming the circular convex portions by the rolling dies, said shaft material is cut into the respective spool valves.

DESCRIPTION OF THE PREFERRED EMBODIMENTS

Figure 1:
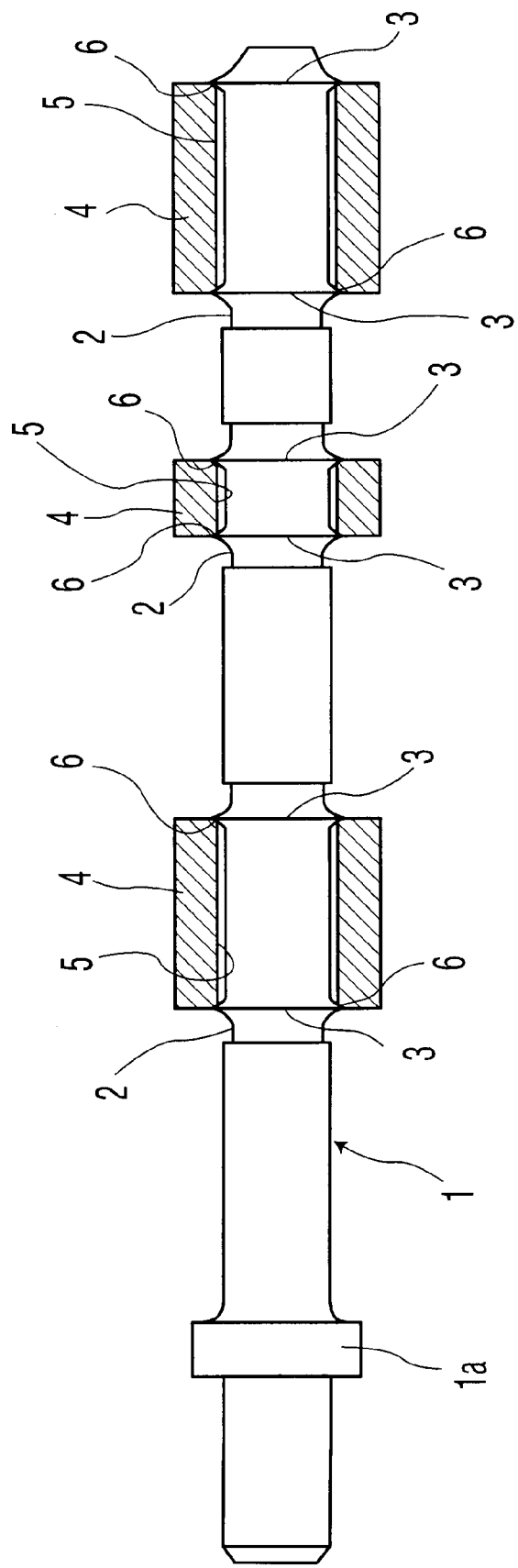
FIG. 1 is a front view illustrating one embodiment of the spool valve of the present invention (collars are shown by sections thereof).

In the following, a preferred embodiment of the spool valve of the present invention is explained in detail for an oil valve for use in a transmission (see FIG. 1).

is a cold or warm headed shaft, and said shaft 1 has a flange 1a for bearing a spring, formed on one end thereof and also has plural small diameter portions 2 formed at required intervals and at predetermined positions of said shaft. On the outer circumferential faces of each small diameter portion of said shaft, a pair of circular convex portions 3 having a diameter larger than the inner diameter of a collar 4 described below are arranged at predetermined intervals so that they are faced to each other. A collar 4 is a collar having a surface subjected to quenching processing such as carburization, and at both ends of a center hole 5 of said collar, circular concave portions 6 chamfered in a taper shape are formed. Said circular convex portions 3 are processed and formed so that the circular concave portions 6 are in close contact with the side faces thereof, whereby said collar is fixed to said shaft to form a valve body.

The spool valve constituted as described above is integrated into a hydraulic control circuit of an automatic transmission or the like, and the valve body switches oil passage by moving the shaft 1 in the shaft direction thereof. The side faces of a pair of the circular convex portions 3 formed on the outer circumferential faces of the small diameter portions 2 of said shaft are in close contact with the taper-shaped circular concave portions 6 of the center hole 5, formed at both ends of the collar 4 as a valve body, whereby the collar 4 is fixed to said shaft securely and stably. Moreover, the surface of said collar 4 is subjected to carburization quenching processing, so that said collar 4 is not abraded even by oil passage-switching movement, whereby oil passage-switching movement can be carried out securely for a long time. In the illustrated embodiment, after clearance fit of said collar 4 to said shaft is carried out, the side faces of said circular convex portions 3 are in close contact with said circular concave portions 6 chamfered in a taper shape to hold said collar 4 by said circular convex portions 3. However, said circular concave portions 6 may have a stepped shape in place of a taper shape as a matter of course. Further, when interference fit of said collar 4 is carried out, a pair of circular convex portions 3 touching both side faces themselves of said collar 4 may be formed on the outer circumferential faces of the small diameter portions 2 of the shaft 1 in place of forming said circular concave portions 6 on said collar 4, as a matter of course.

Next, a preferred embodiment of the process for manufacturing a spool valve according to the present invention is explained in detail by referring to FIG. 2 to FIG. 7.

Figure 2:
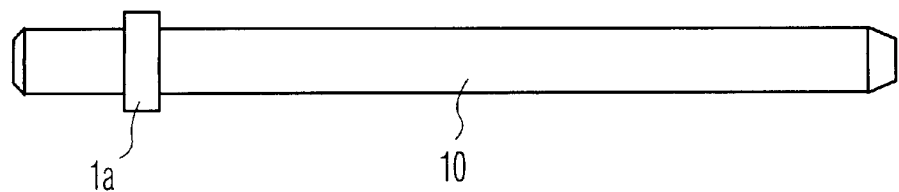
FIG. 2 is a front view illustrating a shaft material to be used in one embodiment of the process for manufacturing a spool valve according to the present invention.
Figure 3:
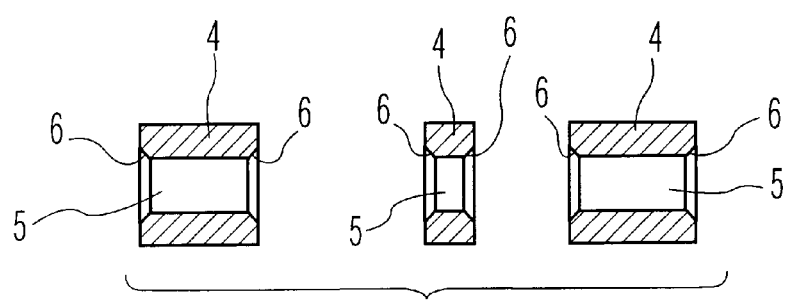
FIG. 3 is sectional view of collars to be used in one embodiment of the process for manufacturing a spool valve according to the present invention.
Figure 4:
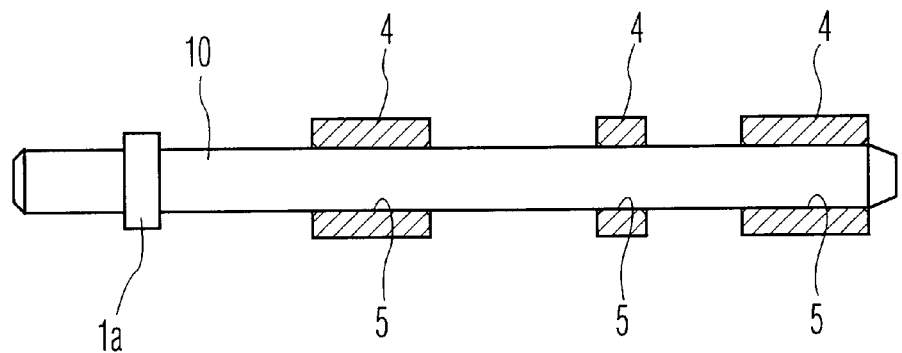
FIG. 4 is a front view partly in section showing a manufacturing step for fitting collars to a shaft material in one embodiment of the process for manufacturing a spool valve according to the present invention (the collars are shown by sections thereof).
Figure 5:
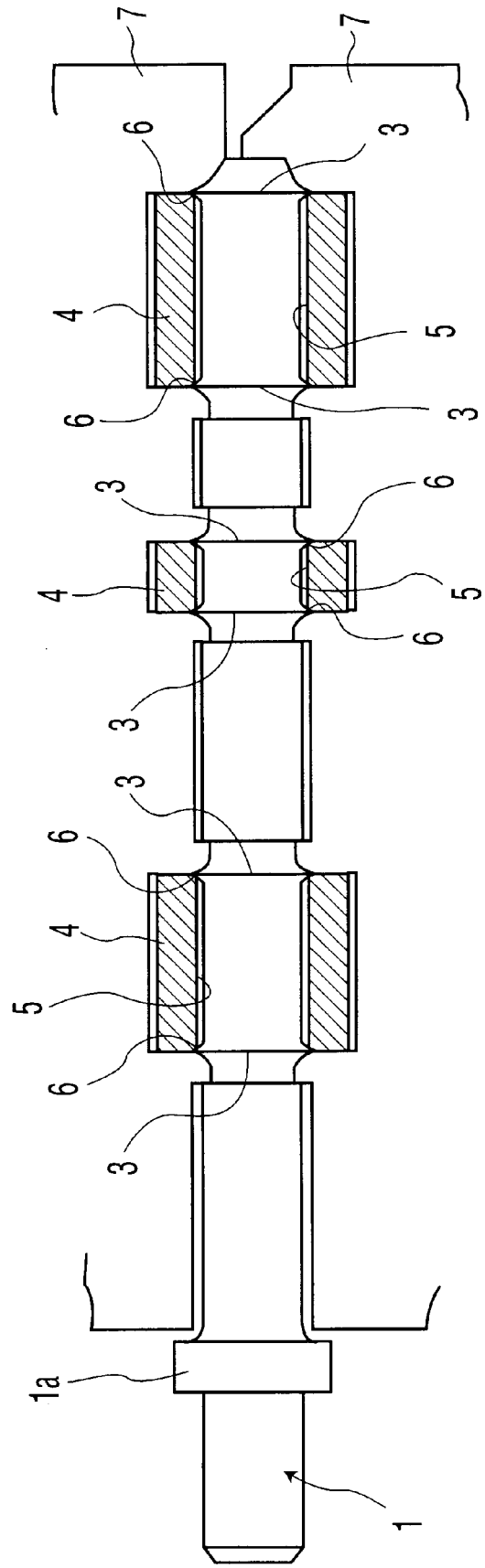
FIG. 5 is a front view partly in section showing a manufacturing step for clinching collars to a shaft material in one embodiment of the process for manufacturing a spool valve according to the present invention (the collars are shown by sections thereof).

As shown in FIG. 2, 10 is a shaft material having a flange 1a for bearing a spring, formed on one end thereof by cold or warm heading. As shown in FIG. 3, 4 is a collar made by cold or warm heading so that it has an inner diameter slightly larger than the outer diameter of the shaft material 10. At both ends of a center hole 5 of said collar 4, circular concave portions 6 chamfered in a taper shape are formed, and the surface of said collar 4 is subjected to quenching processing such as carburization for heightening abrasion resistance. Further, the position at which said collar 4 is provided on the shaft and the length of said collar 4 itself are different depending on the position of oil passage to be switched in a hydraulic control circuit (in the embodiment, collars 4 having three kinds of lengths are used). In manufacture of a spool valve, after clearance fit of said collars 4 to required positions of said shaft material 10 is carried out, respectively, as shown in FIG. 4, the diameters of the portions of said shaft material 10 in the vicinity of both ends of said collars 4 are contracted by rolling dies 7 as shown in FIG. 5, whereby plastic flow of a metal is caused, and the contracted metal of said portions flows into the circular concave portions 6 formed at both ends of the center holes 5 of the collars 4 and are in close contact therewith.

Figure 6:
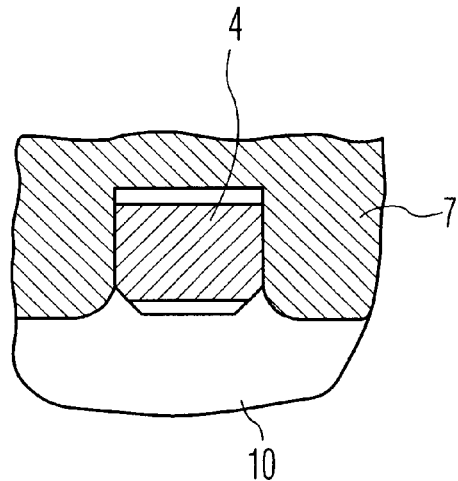
FIG. 6 is an enlarged sectional view showing a clinching step in one embodiment of the process for manufacturing a spool valve according to the present invention.
Figure 7:
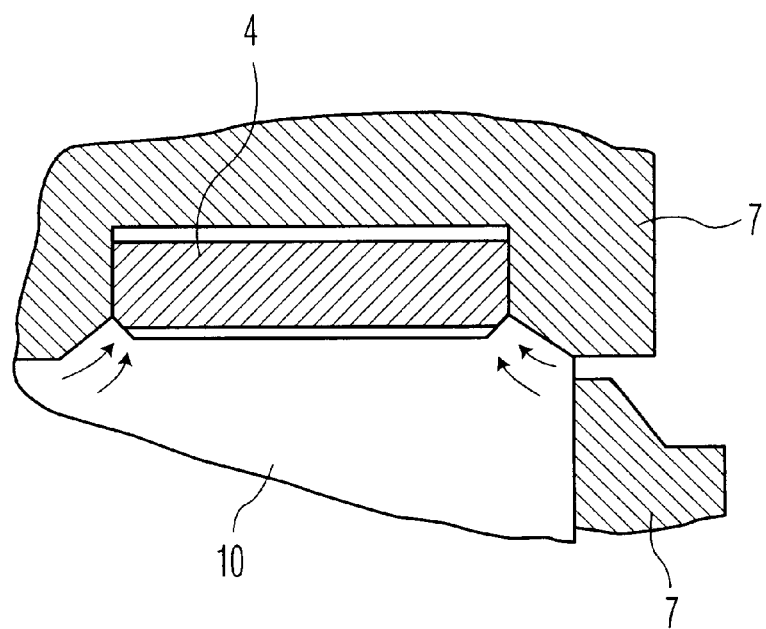
FIG. 7 is an enlarged sectional view showing another embodiment of a clinching step in one embodiment of the process for manufacturing a spool valve according to the present invention.

At this time, the circular concave portions 6 are processed to have a taper shape, so that as shown in FIG. 6 and FIG. 7, plastic flow of the metal toward the tapered surfaces is caused, and gaps existing between said circular concave portions 6 and the shaft 1 are filled with the metal. As a result, irrespective of existence of clearance between the outer diameter of the shaft material 10 and the inner diameters of the collars 4, said collars are fixed to the shaft 1 securely and stably. Thus, said collars 4 are fixed to said shaft 1 to become valve bodies. In the embodiment, said circular concave portions 6 are processed to have a taper shape so that mobility of the metal is improved, but for the object of fixing said collars 4 to said shaft 1, said circular concave portions 6 may have a stepped shape as a matter of course.

Figure 8:
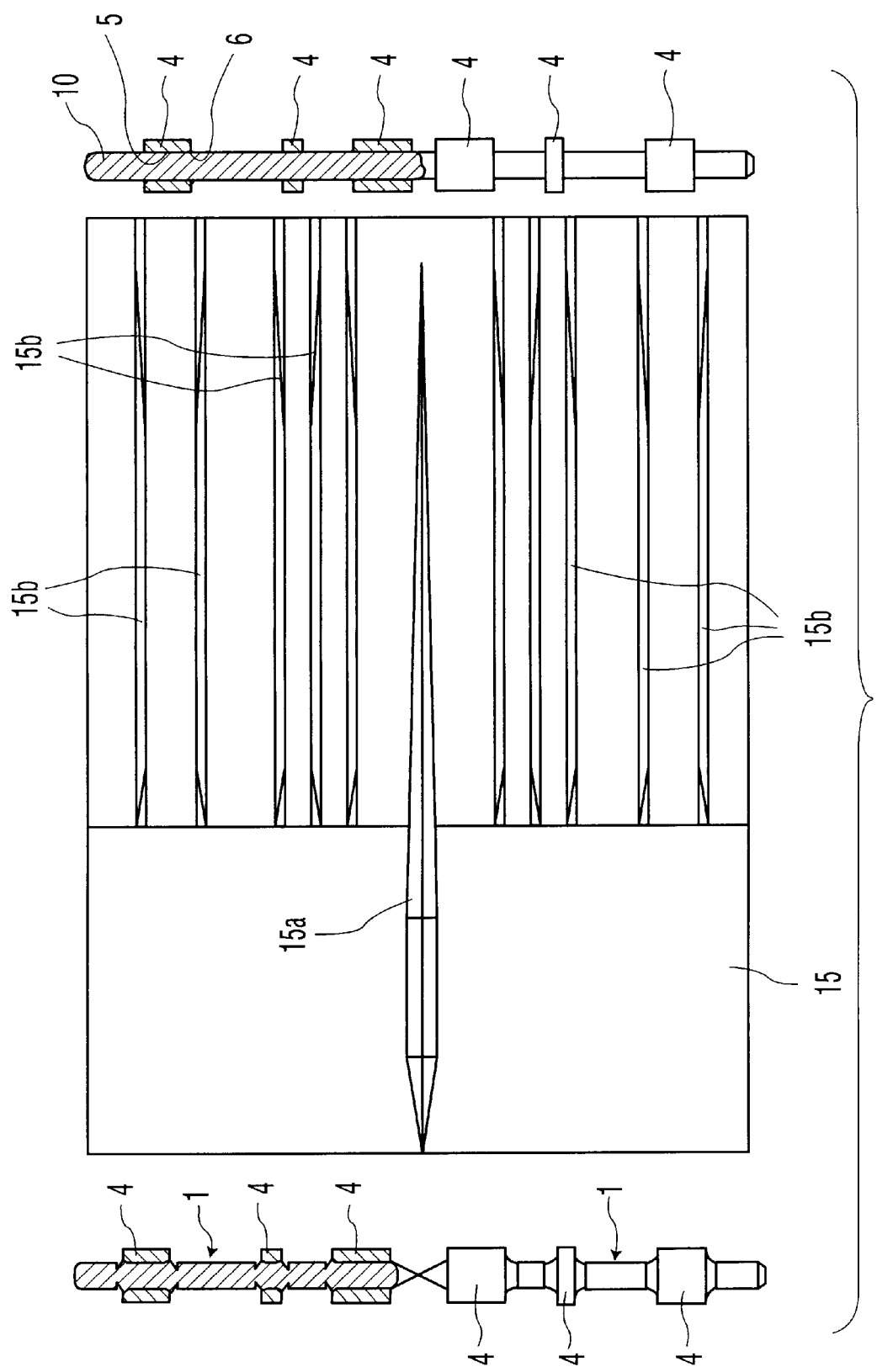
FIG. 8 is a front view showing a manufacturing step for clinching collars to a shaft material in another embodiment of the process for manufacturing a spool valve according to the present invention.
Figure 9:
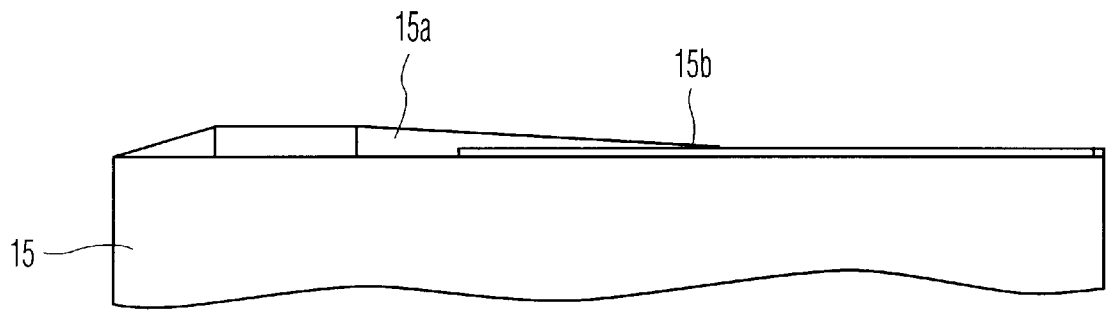
FIG. 9 is a side view of a rolling die used in another embodiment of the process for manufacturing a spool valve according to the present invention.
Figure 10:
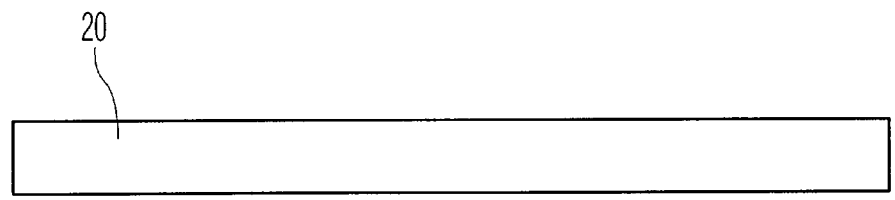
FIG. 10 is a front view of a shaft material to be used for manufacturing a conventional spool valve.
Figure 11:
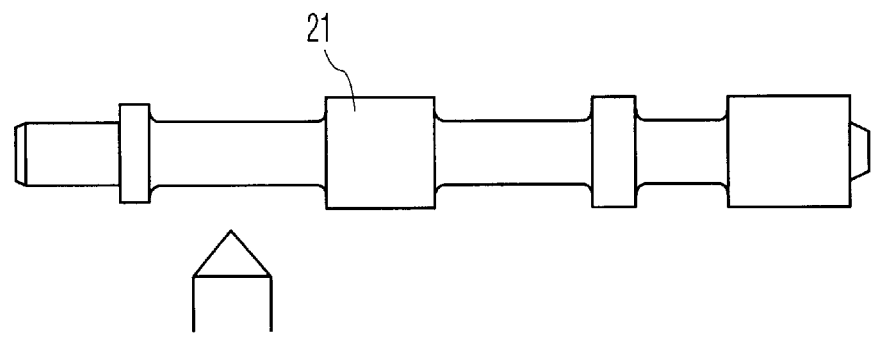
FIG. 11 is a front view of a cutting step of a conventional shaft material.
Figure 12:
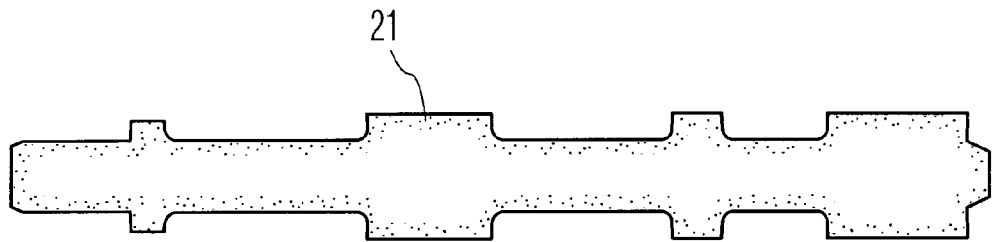
FIG. 12 is a front view of carburization quenching processing of a conventional shaft material.
Figure 13:
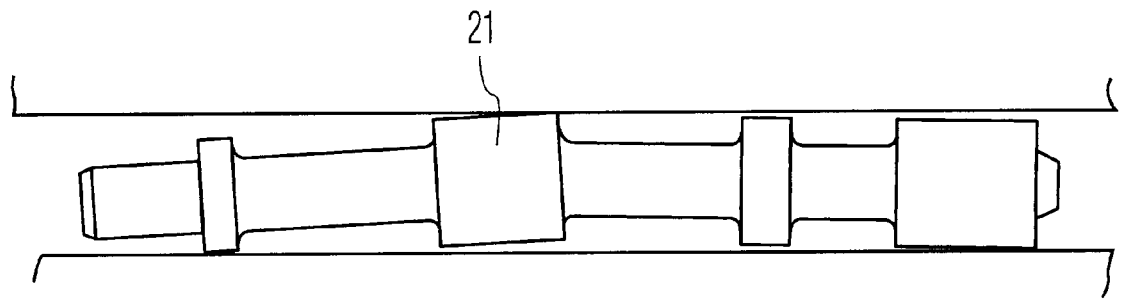
FIG. 13 is a front view of a straightening step of a conventional shaft.

FIG. 8 and FIG. 9 each show a further embodiment of the manufacturing process of the present invention, i.e. a preferred embodiment of the manufacturing process by which plural spool valves (two spool valves in FIG. 8) can be manufactured simultaneously. There are formed circular concave portions 6 which have an inner diameter slightly larger than the outer diameter of a shaft material 10, and which are chamfered in a taper shape and are provided at both ends of center holes 5. Clearance fit of a large number of collars 4 having a surface subjected to carburization quenching processing, for two spool valves to required positions of the shaft material 10 having a length corresponding to two spool valves is carried out (a right side portion of FIG. 8 shows this state). As shown in FIG. 8 and FIG. 9, by clinching die teeth 15b of a rolling die 15 having a halving die tooth 15a formed at the center of an upper surface and a large number of the clinching die teeth 15b formed on the upper surface, the diameters of the portions of said shaft material 10 in the vicinity of both ends of said collars 4 are contracted, whereby plastic flow of a metal of said portions is caused, and the contracted metal moves to gaps existing between said circular concave portions 6 formed at both ends of said center holes 5 of said collars 4 and a shaft 1 and are in close contact with said circular concave portions 6. At this time, said circular concave portions 6 are processed to have a taper shape, so that the mobility of said metal is good as in the embodiment described above. Further, simultaneously with formation of circular convex portions 3 (not shown in FIGS. 8 and 9) by clinching, the diameter of the center portion of the shaft material 10 is gradually contracted by the halving die tooth 15a, and said shaft material 10 is separated and cut by the tooth at the highest position of said halving die tooth 15a (a left side portion of FIG. 8 shows a state immediately before this state). In this embodiment, the same two spool valves are manufactured, but a large number of the same or different spool valves may be manufactured as a matter of course.

As clearly seen from the above explanation, according to the present invention, valve bodies are formed by fixing separately prepared collars subjected to quenching processing such as carburization to a cold or warm headed shaft, so that it is not necessary to subject the shaft to machining of material for obtaining valve bodies, and wasting of material generated by machining of material can be reduced. Further, each collar is fixed by being in close contact with a pair of circular convex portions formed by clinching the shaft by a rolling die, so that the collars are stable even when they are used for a long time. Moreover, only the surfaces of the collars which act as the valve bodies and which are abraded by switching of oil passage are subjected to carburization quenching processing, and it is not necessary to subject the shaft as a whole to carburization quenching processing, so that it is not necessary to subject the shaft to a straightening step for removing thermal strain induced by subjecting the shaft to carburization quenching processing, whereby cost can be reduced by simplification of steps, productivity is improved, and therefore the spool valves can be made manufactured more inexpensively. Further, by clinching a large number of collars subjected to carburization quenching processing, for plural spool valves to a shaft material having a length corresponding to plural spool valves, and then separating and cutting the shaft material, a large number of spool valves can be manufactured simultaneously in a short time, so that the present invention has various advantages for heightening productivity to a great extent.

Thus, the present invention provides a spool valve the problems in the art of which have been solved and a process for manufacturing the same, and therefore greatly contributes to development of the art.

We claim:

1. A process for manufacturing a spool valve, comprising the steps of:

fitting a plurality of quenching processed collars to a shaft material so that said collars are arranged at predetermined positions on said shaft material, said collars having respective substantially central holes through which said shaft material extends;

contracting a diameter of portions of said shaft material in a vicinity of both opposite ends of each of said collars by rolling dies so as to cause plastic flow of a metal constituting said shaft material; and forming pairs of circular convex portions on outer circumferential faces of said diameter contracted portions of said shaft material, said circular convex portions each having an outer diameter larger than an inner diameter of said substantially central holes of said collars, and said circular convex portions being formed such that side faces thereof are in close contact with respective associated circular concave portions formed at both ends of said collars in a vicinity of said substantially central holes of said collars, whereby said collars are fixed to said shaft material.

2. The process according to claim 1, wherein:

said shaft material has a length corresponding to plural spool valves;

a number of said collars to be fitted to said shaft material is selected in accordance with an intended use of said plural spool valves; and at a time of completion of the step of forming said circular convex portions, said shaft material is cut into respective shafts of respective spool valves.

3. The process according to claim 1, wherein:

said diameter contracted portions of said shaft material have linear outer surfaces extending substantially parallel to an axis of said shaft material; and said collars have linear inner surfaces extending substantially parallel to said axis of said shaft material and linear outer surfaces of said diameter contracted portions of said shaft material.

4. The process according to claim 1, wherein:

said collars have lengths shorter than respective lengths of said diameter contracted portions of said shaft material; and said pairs of circular convex portions are spaced apart from each other by distances substantially corresponding to the respective lengths of said collars.

5. A process for manufacturing a spool valve, comprising the steps of:

fitting a plurality of quenching processed collars to a shaft material so that said collars are arranged at predetermined positions on said shaft material, said collars having respective substantially central holes through which said shaft material extends;

contracting peripheral portions of said shaft material in a vicinity of both opposite ends of each of said collars by rolling dies so as to cause plastic flow of a metal constituting said shaft material; and forming pairs of circular convex portions on outer circumferential faces of said contracted peripheral portions of said shaft material, said circular convex portions each having a sectional area wider than a sectional area of said substantially central holes of said collars, and said circular convex portions being formed such that side faces thereof are in close contact with respective associated circular concave portions formed at both ends of said collars in a vicinity of said substantially central holes of said collars, whereby said collars are fixed to said shaft material.

6. The process according to claim 5, wherein:

said shaft material has a length corresponding to plural spool valves;

a number of said collars to be fitted to said shaft material is selected in accordance with an intended use of said plural spool valves; and at a time of completion of the step of forming said circular convex portions, said shaft material is cut into respective shafts of respective spool valves.

7. The process according to claim 5, wherein:

said contracted peripheral portions of said shaft material have linear outer surfaces extending substantially parallel to an axis of said shaft material; and said collars have linear inner surfaces extending substantially parallel to said axis of said shaft material and linear outer surfaces of said contracted peripheral portions of said shaft material.

8. The process according to claim 5, wherein:

said collars have lengths shorter than respective lengths of said contracted peripheral portions of said shaft material; and said pairs of circular convex portions are spaced apart from each other by distances substantially corresponding to the respective lengths of said collars.

* * * * *